(12) United States Patent  
Yamada

(10) Patent No.: US 6,306,059 B1  
(45) Date of Patent: Oct. 23, 2001

(54) INFINITE SPEED RATIO TRANSMISSION DEVICE

(75) Inventor: Kazuhiro Yamada, Miura (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/492,314

(22) Filed: Jan. 27, 2000

(30) Foreign Application Priority Data

Jan. 27, 1999 (JP) .................................................. 11-018260  
Mar. 18, 1999 (JP) .................................................. 11-073426

(51) Int. Cl.⁷ .......................... F16H 37/02; F16H 13/10; F16H 15/38
(52) U.S. Cl. ............................ 475/214; 475/216; 476/41; 74/410
(58) Field of Search .................................. 475/214, 215, 475/216, 218, 183, 192; 476/10, 40, 41; 74/410

(56) References Cited

U.S. PATENT DOCUMENTS 5,807,203 * 9/1998 Imanishi et al. ......................... 476/42  
5,935,039 8/1999 Sakai et al. .............................. 476/10

FOREIGN PATENT DOCUMENTS 10-220551 8/1998 (JP) .

* cited by examiner

Primary Examiner—Sherry Estremsky  
Assistant Examiner—Tisha D. Lewis  
(74) Attorney, Agent, or Firm—Foley & Lardner

(57) ABSTRACT

The rotation output of a continuously variable transmission (2) which transmits the rotation of an input shaft 1 at an arbitrary speed ratio is input to a sun gear (5A) of a planetary gear set (5) arranged on a final output shaft (6). A ring gear (5C) of the planetary gear set (5) is joined to the final output shaft (6). An output gear (3B) of a fixed speed ratio transmission (3) which transmits the rotation of the input shaft (1) at a fixed speed ratio is arranged on the final output shaft (6) and joined to a planet carrier (5B). An input gear 3A of the fixed speed ratio transmission (3), the output gear (3B), a device output gear (7), a final gear (12), the sun gear (5A), a planet gear (5D) of the planetary gear set (5), and the ring gear (5C) comprise helical gears having oblique tooth traces, and the directions of the tooth traces of the sun gear (5A), planet gear (5D) and ring gear (5C) are set so that a thrust load exerted by the planet carrier (5B), which rotates faster than the sun gear (5A), on the sun gear (5A), and a thrust load exerted by the planet carrier (5B), which rotates faster than the sun gear (5A), on the ring gear (5C), do not cancel each other out. A member (14) is further provided which supports the load acting on the sun gear (5A) along the final output shaft (6), and the directions of the tooth traces of the output gear (3B), input gear (3A), device output gear (7) and final gear (12) are set so that either of the thrust load acting on the device output gear (7) and the thrust load acting on the output gear (3B) is opposite to the thrust load acting on the ring gear (5C).

15 Claims, 16 Drawing Sheets

INFINITE SPEED RATIO TRANSMISSION DEVICE

FIELD OF THE INVENTION

This invention relates to helical gears used for an infinite speed ratio transmission device for vehicles.

BACKGROUND OF THE INVENTION

U.S. Pat. No. 5,935,039 and Tokkai Hei 10-220551 published by the Japanese Patent Office in 1998 disclose infinite speed ratio transmission devices for a vehicle wherein a fixed speed ratio transmission and a planetary gear set are combined with a toroidal continuously variable transmission (CVT) in order to increase the speed ratio range of the CVT.

In each of these devices, an engine output is input into the CVT and the fixed speed ratio transmission. The output shaft of the CVT is joined with a sun gear of the planetary gear set, and the output shaft of the fixed speed ratio transmission is joined with a planet carrier of the planetary gear set via a power circulation clutch. A ring gear of the planetary gear set joined to a final output shaft of the transmission device drives the wheels. The output shaft of the CVT is also joined to the final output shaft of the transmission via a direct clutch.

SUMMARY OF THE INVENTION

In order to prevent noise and mechanical vibration in the fixed speed ratio transmission and the transmission device output gear of such a transmission device, helical gears are generally used. Some of these helical gears are fixed to the final output shaft. The helical gears generate a thrust load in a gripping part according to the tooth trace direction of the gears and the direction of torque transmission. On the other hand, when the CVT and sun gear are joined together via a chain, the tension of the chain exerts a force in a perpendicular direction to the final output shaft of the transmission device. Due to the thrust forces acting on the helical gears, and the perpendicular force exerted by the chain, the final output shaft tends to bend. If the final output shaft bends, the durability of the bearing which supports the final output shaft will decrease, and the power transmission efficiency will fall due to the increase of friction in the bearing.

It is therefore an object of this invention to alleviate the bending of the final output shaft of an infinite speed ratio transmission device.

In order to achieve the above object, this invention provides an infinite speed ratio transmission device for a vehicle, comprising an input disk, a final output shaft, a planetary gear set, a continuously variable transmission, a fixed speed ratio transmission, a device output gear fixed to the final output shaft, and a final gear engaging with the device output gear.

The planetary gear set comprises a planet gear, a planet carrier supporting the planet gear, a sun gear externally connected to the planet gear, and a ring gear internally connected to the planet gear. The ring gear is joined to the final output shaft. The continuously variable transmission transmits a rotation of the input shaft to the sun gear at an arbitrary speed ratio. The fixed speed ratio transmission comprises an input gear fixed to the input shaft, and an output gear which is engaged with the input gear, fixed to the planet carrier and rotating around the final output shaft.

The input gear, the output gear, the device output gear, the final gear, the sun gear, the planet gear and the ring gear all comprise helical gears having oblique tooth traces.

The directions of the tooth traces of the sun gear, planet gear and ring gear are set so that a thrust load exerted by the planet carrier, which rotates faster than the sun gear, on the sun gear via the planet gear, and a thrust load exerted by the planet carrier, which rotates faster than the sun gear, on the ring gear via the planet gear, do not cancel each other out. A member is further provided which supports a load acting on the sun gear along the final output shaft. The directions of the tooth traces of the output gear, the input gear, the device output gear and the final gear are set so that either of the thrust load acting on the device output gear and the thrust load acting on the output gear is opposite to the thrust load acting on the ring gear.

Alternatively, the directions of the tooth traces of the sun gear, planet gear and ring gear are set so that a thrust load exerted by the planet carrier, which rotates faster than the sun gear, on the sun gear via the planet gear, and a thrust load exerted by the planet carrier, which rotates faster than the sun gear, on the ring gear via the planet gear, cancel each other out. In this case, the directions of the tooth traces of the fixed output gear, the fixed input gear, the device output gear and the final gear are set so that the thrust load acting on the device output gear and the thrust load acting on the output gear act on the final output shaft in opposite directions.

The details as well as other features and advantages of this invention are set forth in the remainder of the specification and are shown in the accompanying drawings.

DESCRIPTION OF THE PREFERRED EMBODIMENTS

Figure 1:
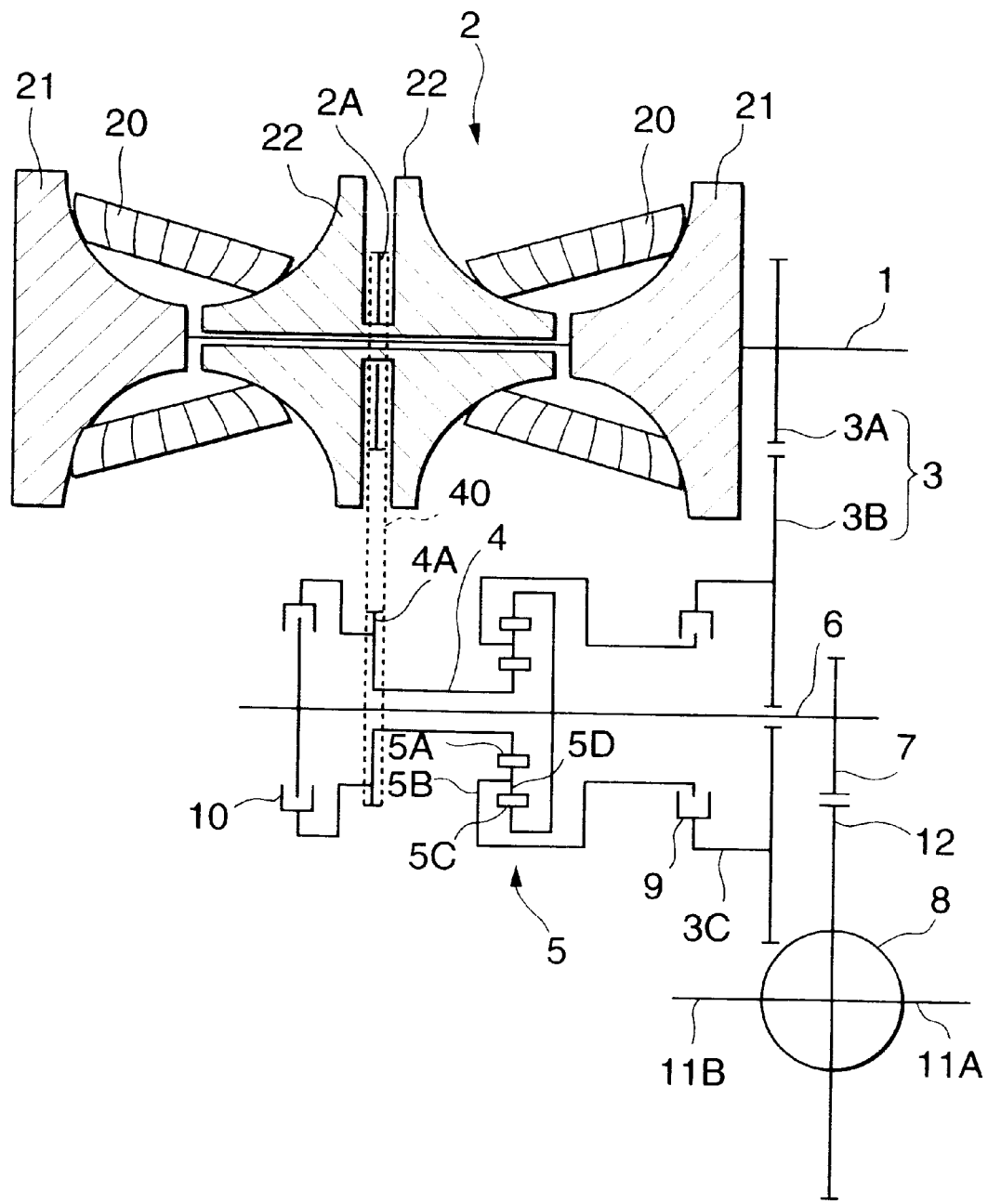
FIG. 1 is a schematic diagram of an infinite speed ratio transmission device according to this invention.

Referring to FIG. 1 of the drawings, an infinite speed ratio transmission device for a vehicle comprises an input shaft 1, toroidal continuously variable transmission (referred to hereafter as CVT) 2, fixed speed ratio transmission 3, planetary gear set 5 and final output shaft 6.

The CVT 2 is equipped with two pairs of input disks 21 and output disks 22. A pair of power rollers 20 are gripped by the input disk 21 and the output disk 22 of each pair. The input disks 21 are joined to the input shaft 1. The input shaft 1 is joined to the output shaft of an engine, not shown. The rotation of the output disks 22 is transmitted to a CVT output shaft 4 via a sprocket 2A, chain 40 and sprocket 4A.

The CVT output shaft 4 is joined to a sun gear 5A of the planetary gear set 5. It is also joined to the final output shaft 6 via a direct clutch 10.

The fixed speed ratio transmission 3 is equipped with an input gear 3A which rotates together with the input shaft 1, output gear 3B, and gear output shaft 3C.

Figure 2:
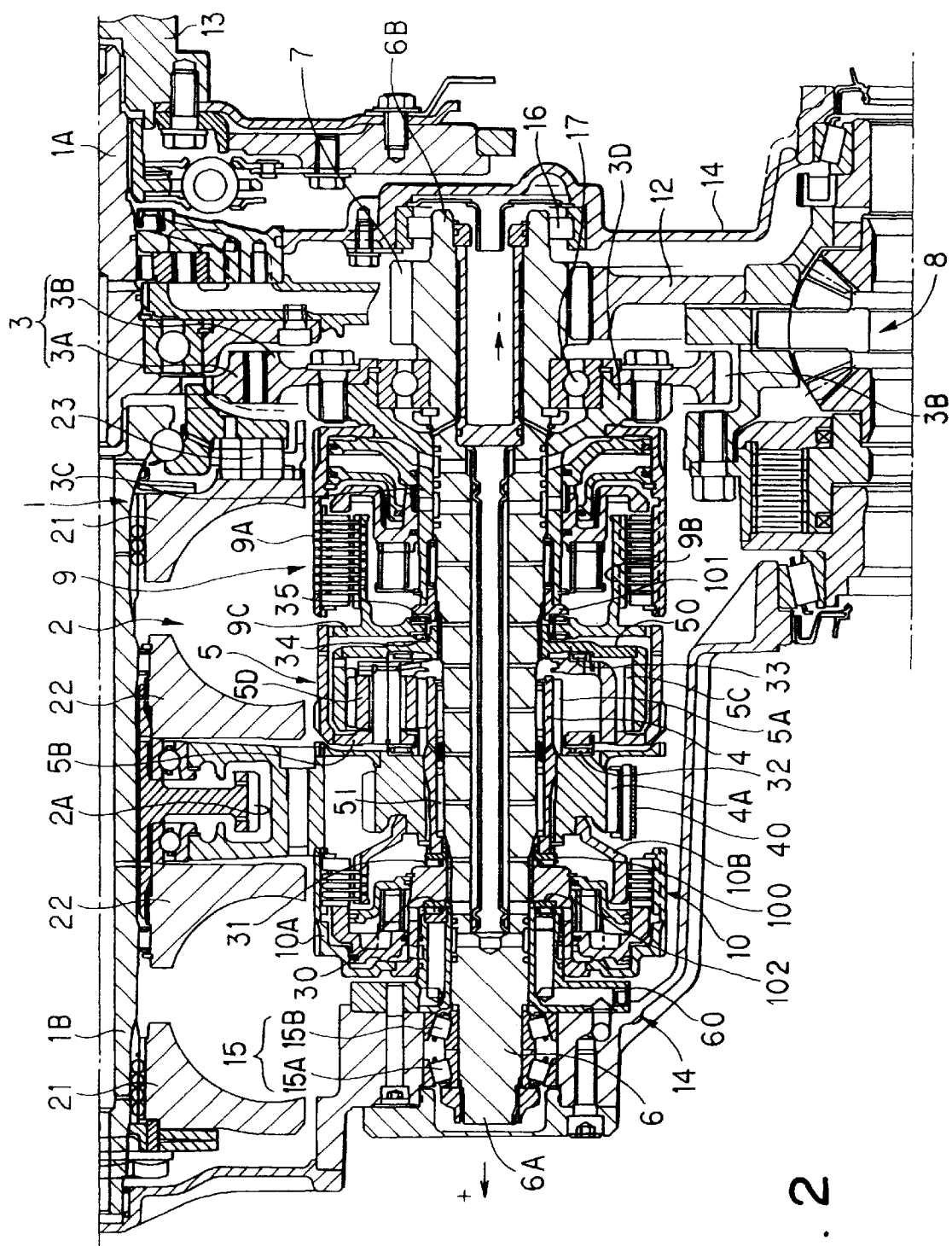
FIG. 2 is vertical sectional view of the infinite speed ratio transmission device according to this invention.

The input gear 3A is meshed with the output gear 3B, and the output gear 3B is joined to the gear output shaft 3C via a flange 3D as shown in FIG. 2. The gear output shaft 3C is joined to a planet carrier 5B carrying planet gears of the planetary gear set 5 via a power circulation clutch 9. A ring gear 5C of the planetary gear set 5 is joined to the final output shaft 6.

The rotation of the final output shaft 6 is transmitted to drive wheel shafts 11A, 11B of the vehicle via a device output gear 7, final gear 12 and differential 8.

In this infinite speed ratio transmission device, the drive wheel shafts 11A, 11B are driven by two kinds of power transmission mode, i.e., a power circulation mode wherein the power circulation clutch 9 is engaged and the direct clutch 10 is released, and a direct mode wherein the power circulation clutch 9 is released and the direct clutch 10 is engaged. In the power circulation mode, the rotation speed of the final output shaft 6 is continuously varied from a negative value to a positive value according to a difference of the speed ratios of the CVT 2 and the fixed speed ratio transmission 3.

Referring now to FIG. 2, the input shaft 1 comprises a shaft 1B joined to the input disks 21, and a shaft 1A joined to a crankshaft 13 of the engine. The shafts 1A and 1B are coaxially arranged, and rotate together through loading cams 23. The loading cams 23 generate a pressing force in the axial direction according to the input torque from the shaft 1A. This pressing force presses the input disks 21 toward the output disks 22. Due to this pressing force, the power rollers 20 are gripped between the input disks 21 and output disks 22.

The input gear 3A of the fixed speed ratio transmission 3 is fixed to the shaft 1A.

The input shaft 1 and final output shaft 6 are arranged parallel inside a casing 14.

One end 6A of the final output shaft 6 is supported by an angular bearing unit 15 that comprises tapered roller bearings 15A and 15B, and the other end 6B is supported by a radial bearing 16.

The tapered roller bearing 15A supports a thrust load in the direction of the end 6A, and a tapered roller bearing 15B supports a thrust load in the direction of the end 6B. In the following description, the thrust load acting in the direction of the end 6A will be taken as a positive thrust load, and the thrust load acting on the end 6B will be taken as a negative thrust load.

An oil retainer 60, direct mode clutch 10, CVT output shaft 4 joined to the sprocket 4A, planetary gear set 5, power circulation mode clutch 9, output shaft 3C and output gear 3B of the fixed speed ratio transmission 3, and the device output gear 7, are joined to the final output shaft 6 between the angular bearing unit 15 and radial bearing 16. These parts are previously set up and fitted in the casing 14 as an assembly.

The CVT output shaft 4 comprises a hollow shaft of which the outer circumference is joined to the sprocket 4A. One end of the CVT output shaft 4 is joined to the sun gear 5A, and the other end is joined to the direct clutch 10. The CVT output shaft 4 rotates relatively to the final output shaft 6 via plural needle bearings 51 disposed on the inner circumference.

The output shaft 3C of the fixed speed ratio transmission 3 is formed in the shape of a hollow shaft and the final output shaft 6 penetrates inside. The output gear 3B fixed to the output shaft 3C via the flange 3D is supported by the final output shaft 6 via a bearing 17. The bearing 17 comprises a deep groove ball bearing that can support the thrust load. The flange 3D is also joined to a clutch drum 9A of the power circulation mode clutch 9.

The sun gear 5A of the planetary gear set 5, planet gears 5D, and ring gear 5C, input gear 3A and output gear 3B of the fixed speed ratio transmission 3, and device output gear 7 and final gear 12, all comprise helical gears.

To support the thrust load of these helical gears, the parts arranged on the final output shaft 6 have the following bearing structure.

First, the oil retainer 60 is fixed to the casing 14, and the final output shaft 6 penetrates the inner circumference of the oil retainer 60. A needle bearing 30 to support the positive thrust load acting on the final output shaft 6 is disposed between the end face on the right-hand side of the drawing of the oil retainer 60, and a collar 102 attached to the base of the clutch drum 10A of the direct mode clutch 10.

The clutch drum 10A is spline jointed to the outer circumference of the final output shaft 6, and it rotates together with the final output shaft 6. A hub 10B engaged with the clutch drum 10A is joined to the sprocket 4A. A needle bearing 31 to support the positive thrust load acting on the final output shaft 6 is disposed between the base of the clutch drum 10A and a collar 100 fitted to one end of the CVT output shaft 4. A needle bearing 32 is also arranged between the side face of the sprocket 4A and the planet carrier 5B of the planetary gear set 5. Further, a needle bearing 33 is arranged between the planet carrier 5B and a supporting wall 50 which joins the ring gear 5C to the final output shaft 6.

A hub 9B of the power circulation mode clutch 9 is joined to the planet carrier 5B via a supporting wall 9C. A needle bearing 34 is arranged between the supporting walls 50 and 9C, and a needle bearing 35 is arranged between the circular wall 9C and a collar 101 fitted to the gear output shaft 3C.

Due to the above construction, the negative thrust load acting on the gear output shaft 3C is transmitted to the final output shaft 6 via the flange 3D and bearing 17, and supported by the tapered roller bearing 15B of the bearing unit 15. The negative thrust load acting on the sun gear 5A is transmitted to the final output shaft 6 via the needle bearing 32, planet carrier 5B, needle bearing 33, supporting wall 50, needle bearing 34, supporting wall 9C, needle bearing 35, collar 101, gear output shaft 3C and bearing 17, and is also supported by the tapered roller bearing 15B of the bearing unit 15. The positive thrust load acting on the sun gear 5A is supported in the casing 14 via the CVT output shaft 4, collar 100, needle bearing 31, base of clutch drum 10A, collar 102, needle bearing 30 and oil retainer 60. The positive thrust load acting on the ring gear 5C is transmitted to the planet carrier 5B via the needle bearing 33 between the supporting wall 50 and planet carrier 5B, and is supported in the casing 14 via the needle bearing 32, sprocket 4A, CVT output shaft 4, collar 100, needle bearing 31, base of clutch drum 10A, collar 102, needle bearing 30 and oil retainer 60.

The positive thrust load acting on the output gear 3B of the fixed speed ratio transmission 3 or transmission output gear 7 is supported by a tapered roller bearing 15A of the bearing unit 15 via the final output shaft 6.

Next, the setting of the rotation directions of the shafts and the tooth trace directions of the helical gears of the transmission device according to this invention when the vehicle is moving forward in the power circulation mode, will be described referring to FIG. 3.

Figure 3:
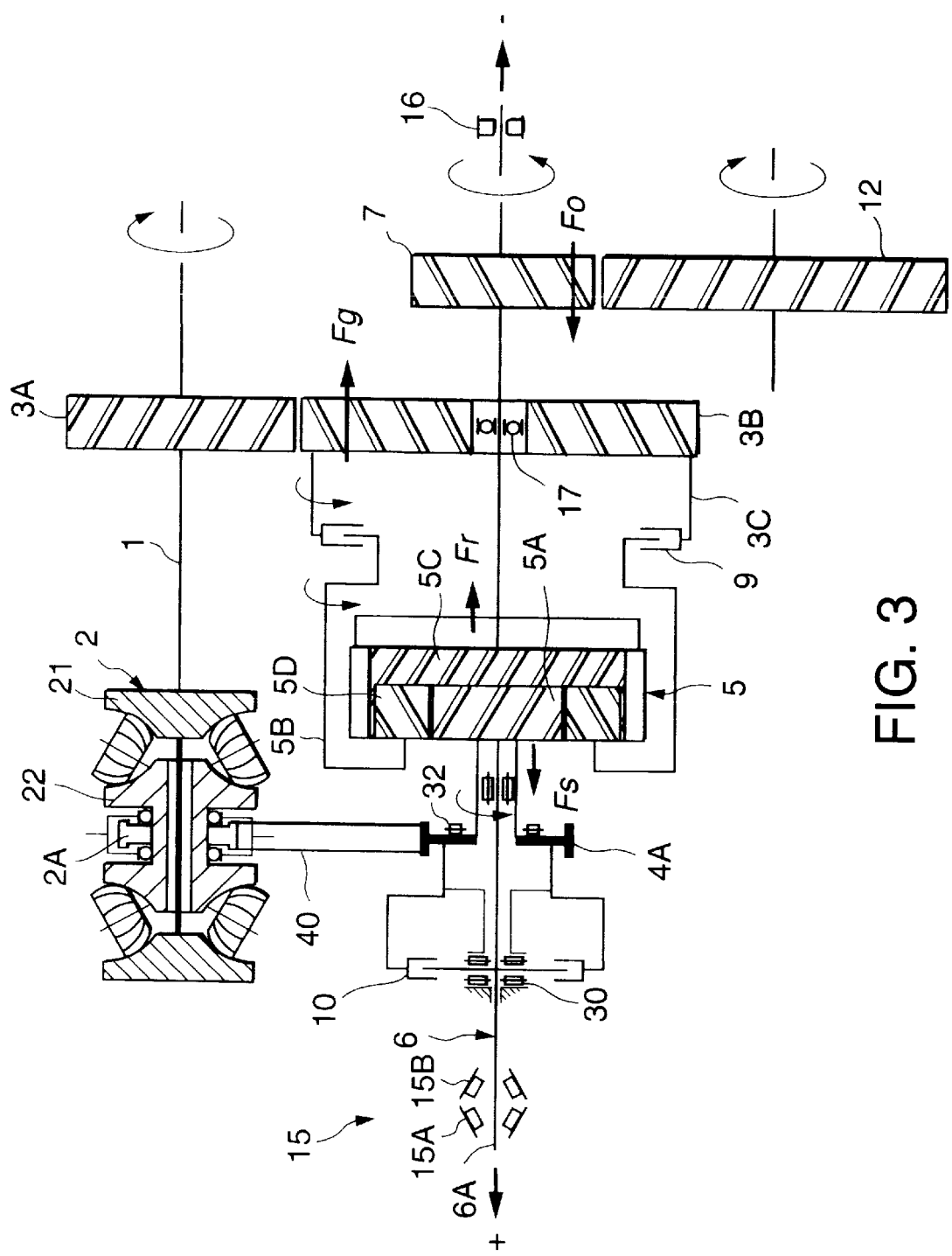
FIG. 3 is a schematic diagram of the infinite speed ratio transmission device for the purpose of describing tooth traces of helical gears according to this invention.

When the rotation direction of the input shaft 1 is clockwise when it is viewed from the right side of FIG. 3, the input gear 3A of the fixed speed ratio transmission 3 rotates clockwise, and the output gear 3B thereof rotates counterclockwise. The planetary gear 5B joined to the output gear 3B via the power circulation clutch 9 also rotates counterclockwise.

In the CVT 2, as the rotation directions of the input disk 21 and output disk 22 are opposite to one another, the sprocket 2A rotates counterclockwise, and the sprocket 4A joined to the sprocket 2A via a chain 40 also rotates counterclockwise. The sun gear 5A joined to the sprocket 4A via the CVT output shaft 4 also rotates counterclockwise. If it is considered here that the clockwise rotation of the final gear 12 corresponds to forward motion of the vehicle, the rotation direction of the final output shaft 6 and ring gear 5C at this time will be counterclockwise.

In relation with the rotation directions of the these helical gears, the directions of the tooth traces of the helical gears are set as follows. The tooth trace of the output gear 3B of the fixed speed ratio transmission 3 and the tooth trace of the transmission device output gear 7 are left-handed. Correspondingly, the tooth trace of the input gear 3A of the fixed speed ratio transmission 3 and the tooth trace of the final gear 12 are right-handed. In the planetary gear set 5, the sun gear 5A is right-handed, the planet gears 5D are left-handed, and the ring gear 5C is left-handed.

Herein, right-handed means that the tooth trace rotates clockwise as the gear extends away from the observer when viewed from an axial direction, and left-handed means that the tooth trace rotates counterclockwise as the gear extends away from the observer when viewed from an axial direction.

In FIG. 3, the inclinations of the sun gear 5A and the ring gear 5C are the same, but this is due to the fact that whereas the ring gear 5C is an internal contact gear, all the other gears are external contact gears. In this case, whereas the tooth trace of the sun gear 5A is right-handed, the tooth trace of the ring gear SC represented by the same oblique line is left-handed.

Next, the direction is which engine torque is transmitted will be described when the vehicle is moving forward in the power circulation mode. In the fixed speed ratio transmission 3, torque is transmitted from the input gear 3A to the output gear 3B. In the CVT 2, torque is transmitted from the sprocket 2A to the sprocket 4A via the chain 40. In the planetary gear set 5 when the vehicle advances in the power circulation mode, torque is transmitted from the planet gears 5B and 5B to the sun gear 5A and ring gear 5C, and to the final gear 12 via the transmission device output gear 7 which rotates together with the ring gear 5C.

Therefore, from the directions of the tooth traces of the helical gears and the torque transmission direction, insofar as regards the thrust loads acting on the helical gears on the final output shaft 6, if the thrust load acting on the output gear 3B of the fixed speed ratio transmission 3 is Fg and the thrust load acting on the device output gear 7 is Fo, Fg is a negative load and Fo is a positive load.

Further, in the planetary gear set 5, if the thrust load acting on the sun gear 5A is Fs and the thrust load acting on the ring gear 5C is Fr, Fs is a positive load and Fr is a negative load.

Herein, the thrust load Fs acting on the sun gear 5A is supported in the casing 14 by the aforementioned support structure. The thrust load Fr acting on the ring gear 5C is transmitted to the final output shaft 6, and is supported by the tapered roller bearing 15B.

Figure 16:
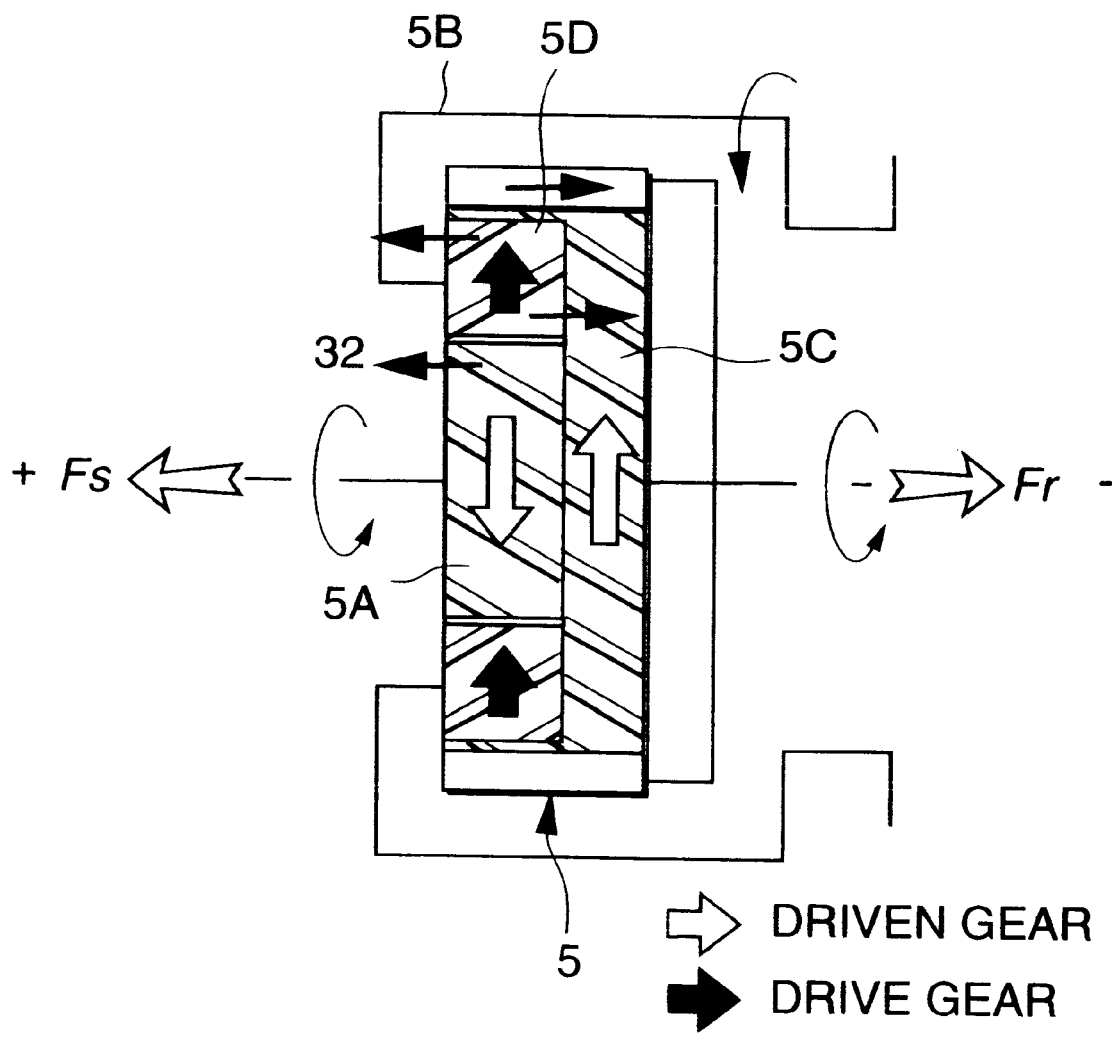
FIG. 16 is block diagram explaining the effect of the tooth traces of the helical gears of the planetary gear set and a thrust load according to this invention.

The reaction force of the thrust load Fs and reaction force of the thrust load Fr act on the planet gears 5D as shown in FIG. 16, but the reaction forces of these thrust loads act in mutually opposite directions, and cancel each other out.

In this infinite speed ratio continuously variable transmission device, the thrust loads acting on the helical gears on the final output shaft 6 are summarized in the following Table 1.

TABLE 1

| | Output gear 3B | Sun gear 5A | Ring gear 5C | Device output gear 7 |
|---|---|---|---|---|
| Thrust load | Fg | Fs | Fr | Fo |
| Tooth trace direction | left | right | left | left |
| Thrust load direction | negative | positive | negative | positive |
| Torque transmission | driven | driven | driven | driving |
| Rotation direction | anti-clockwise | anti-clockwise | anti-clockwise | anti-clockwise |

In Table 1, positive/negative of the thrust loads correspond to the directions shown in FIGS. 2 and 3 by arrows.

The positive thrust load Fs acting on the sun gear 5A is supported directly by the casing 14, while the thrust load Fr acting on the ring gear 5C is supported by the tapered roller bearing 15B via the final output shaft 6. Therefore, the thrust loads Fs and Fr do not cancel each other out. In this situation, if it is arranged that the directions of the thrust load Fg acting on the fixed speed ratio output gear 3B, thrust load Fr acting on the ring gear 5C and thrust load Fo acting on the transmission output gear 7 are not all the same, the sum total of the thrust loads acting on the final output shaft 6 can be suppressed to a small value.

According to the tooth traces specified in Table 1, the tooth traces of the output gear 3B of the fixed speed ratio transmission 3, ring gear 5C and device output gear 7 are left-handed, and only the tooth trace of the sun gear 5A is right-handed. As a result, the thrust loads Fg, Fr are negative loads, while the thrust load Fo is a positive load. As the negative loads and positive load cancel each other out, the sum total of the thrust load acting on the final output shaft 6 (Fr+Fg+Fo) can be suppressed to a small value.

Suppressing the thrust load acting on the final output shaft 6 to a small value is effective in preventing increase in the size of the angular bearing unit 15 supporting the thrust load, and increase of friction of the final output shaft 6 with the bearing unit 15, and it is advantageous also from the viewpoint of durability and compactness of the infinite speed ratio continuously variable transmission device. It further contributes to improving the power transmission efficiency of the infinite speed ratio continuously variable transmission device.

In the engine brake condition, a torque is input into the final output shaft 6 via the device output gear 7 from the final gear 12. In this case, the directions of all the thrust loads Fg, Fs, Fr, Fo are all the reverse of those in Table 1. Therefore, the sum total (Fr+Fg+Fo) of the positive thrust load and negative thrust load arising in the final output shaft 6 are suppressed to a small value also in the engine braking condition.

Further, the helix angles βg, βo, βr of the output gear 3B of the fixed speed ratio transmission 3, device output gear 7 and ring gear 5C are set to satisfy or to approximate to the following equation (1).

$$\frac{\tan\beta o}{(1+\alpha)\cdot Ro} = \frac{\tan\beta g}{Rg} + \frac{\tan\beta r}{(1+\alpha)\cdot Rr} \quad (1)$$

where, βg=helix angle of output gear 3B of fixed speed ratio transmission 3,

Rg=radius of pitch circle of output gear 3B of fixed speed ratio transmission 3, βo=helix angle of device output gear 7, Ro=radius of pitch circle of device output gear 7, βr=helix angle of ring gear 5C, Rr=radius of pitch circle of ring gear 5C, and α=number of teeth of sun gear 5A/number of teeth of ring gear 5C.

Helix angles and pitch circle radii are specified by JIS B0102.

The helix angle βo of the device output gear 7 may be found from the following equation (2) which is a modification of equation (1).

$$\tan\beta o = (1+\alpha)\cdot Ro \cdot \left\{\frac{\tan\beta g}{Rg} + \frac{\tan\beta r}{(1+\alpha)\cdot Rr}\right\} \quad (2)$$

For example, when the radius of pitch circle Rg of the fixed speed ratio output gear 3B=85 mm, the radius of pitch circle Rr of the ring gear 5C=55 mm, the radius of pitch circle Ro of the transmission device output gear 7=30 mm, α=0.5, and βg=βr=21 degrees, $$\tan\beta o = (1-0.5)\cdot 30 \cdot \left\{\frac{\tan 21°}{85} + \frac{\tan 21°}{(1+0.5)\cdot 55}\right\}$$

$$= 0.413$$

βo=tan$^{-1}$0.413≃22.4°

In the direct mode wherein the power circulation mode clutch 9 is released and the direct mode clutch 10 is engaged, the output torque of the CVT2 is transmitted to the final output shaft 6 only via the direct mode clutch 10, and the fixed speed ratio transmission 3 and planetary gear set 5 race without transmitting torque. Therefore, the thrust load acting on the final output shaft 6 becomes almost equal to the thrust load Fo of the transmission output gear 7.

Figure 4:
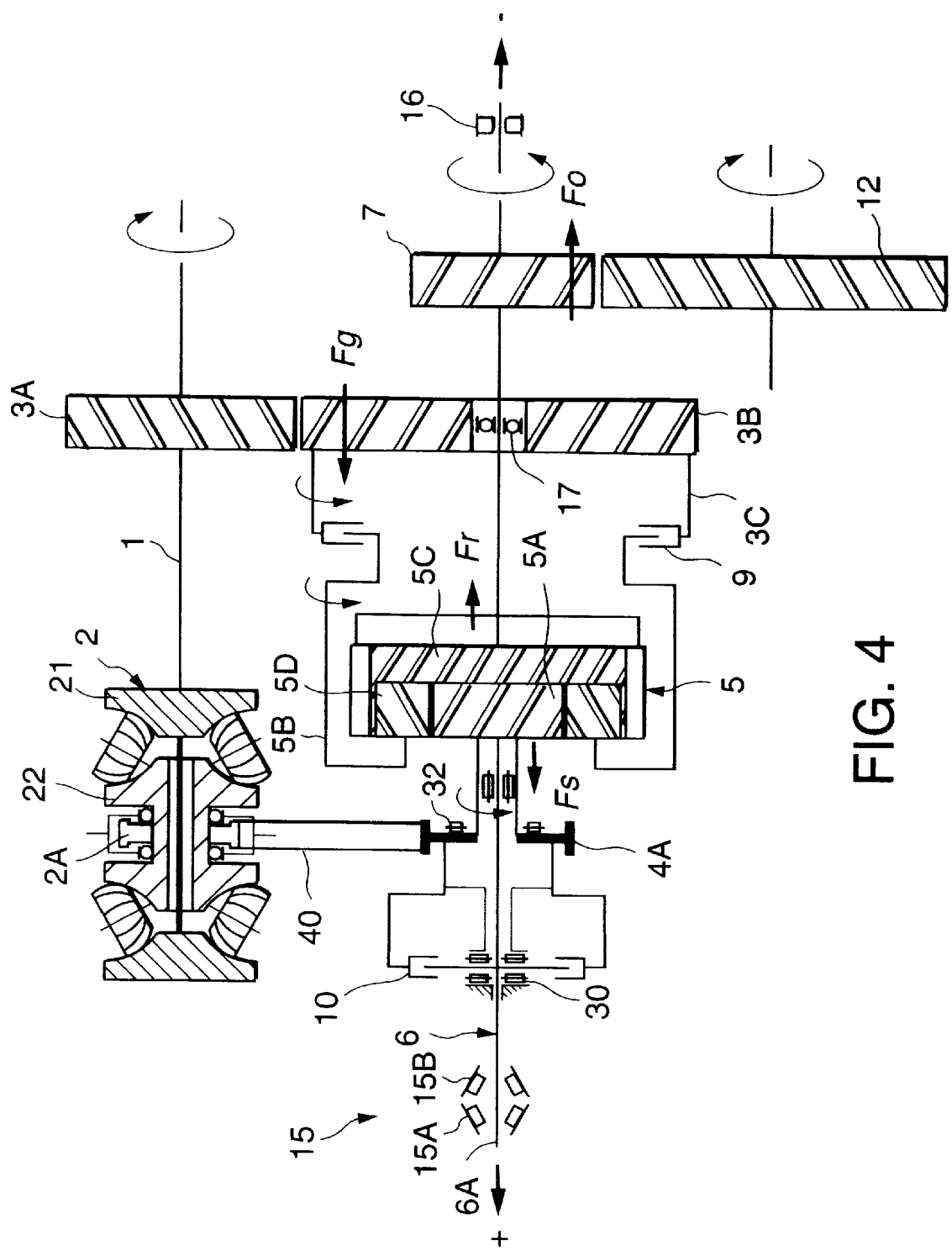
FIG. 4 is similar to FIG. 3, but showing a second embodiment of this invention.

Next, a second embodiment of this invention will be described referring to FIG. 4.

In this embodiment, the tooth traces of the output gear 3B of the fixed speed ratio transmission and the device output gear 7 of the first embodiment are changed to right-handed. Correspondingly, the tooth traces of the input gear 3A of the fixed speed ratio transmission 3 and the final gear 12 are changed to left-handed. The remaining features of the construction and the shaft rotation directions are the same as those of the first embodiment. The thrust loads acting on the gears in this embodiment are shown by the following Table 2.

TABLE 2

| | Output gear 3B | Sun gear 5A | Ring gear 5C | Device output gear 7 |
|---|---|---|---|---|
| Thrust load | Fg | Fs | Fr | Fo |
| Tooth trace direction | right | right | left | right |
| Thrust load direction | positive | positive | negative | negative |
| Torque transmission | driven | driven | driven | driving |
| Rotation direction | anti-clockwise | anti-clockwise | anti-clockwise | anti-clockwise |

In this embodiment, whereas the thrust load Fg which acts on the fixed speed ratio output gear 3B is a positive load, the thrust load Fo which acts on the transmission output gear 7 is a negative load. Also in this embodiment, as the direction of one load of the thrust loads Fg, Fr and Fo differs from the other two loads, the sum total of thrust load applied to the final output shaft 6 can be suppressed small.

Figure 5:
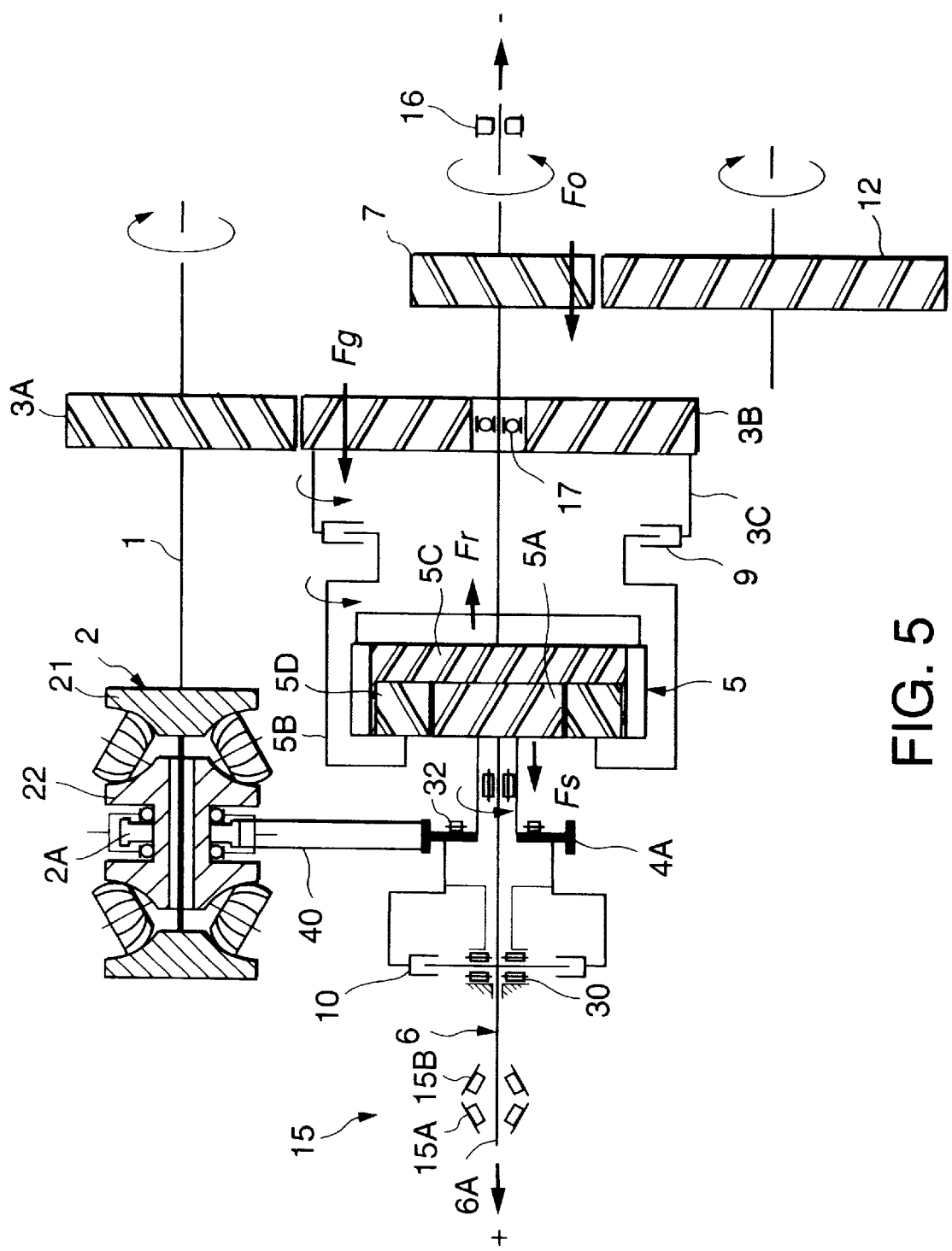
FIG. 5 is similar to FIG. 3, but showing a third embodiment of this invention.

Next, a third embodiment of this invention will be described referring to FIG. 5.

In this embodiment, the tooth trace of the output gear 3B of the fixed speed ratio transmission 3 of the first embodiment is changed to right-handed, and correspondingly, the tooth trace of the input gear 3A of the fixed speed ratio transmission 3 is changed to left-handed.

The remaining features of the construction and the shaft rotation directions are the same as those of the first embodiment.

The thrust loads acting on each gear in this embodiment are shown by the following Table 3.

TABLE 3

| | Output gear 3B | Sun gear 5A | Ring gear 5C | Device output gear 7 |
|---|---|---|---|---|
| Thrust load | Fg | Fs | Fr | Fo |
| Tooth trace direction | right | right | left | left |
| Thrust load direction | positive | positive | negative | positive |
| Torque transmission | driven | driven | driven | driving |
| Rotation direction | anti-clockwise | anti-clockwise | anti-clockwise | anti-clockwise |

In this embodiment, as in the first embodiment, a positive load of the sun gear 5A is supported by the casing 14, and the thrust loads Fg, Fr and Fo act on the final output shaft 6. As the direction of one load of these three loads differs from that of the other two loads, the sum total of thrust load acting on the final output shaft 6 can be suppressed small also in this embodiment.

Figure 6:
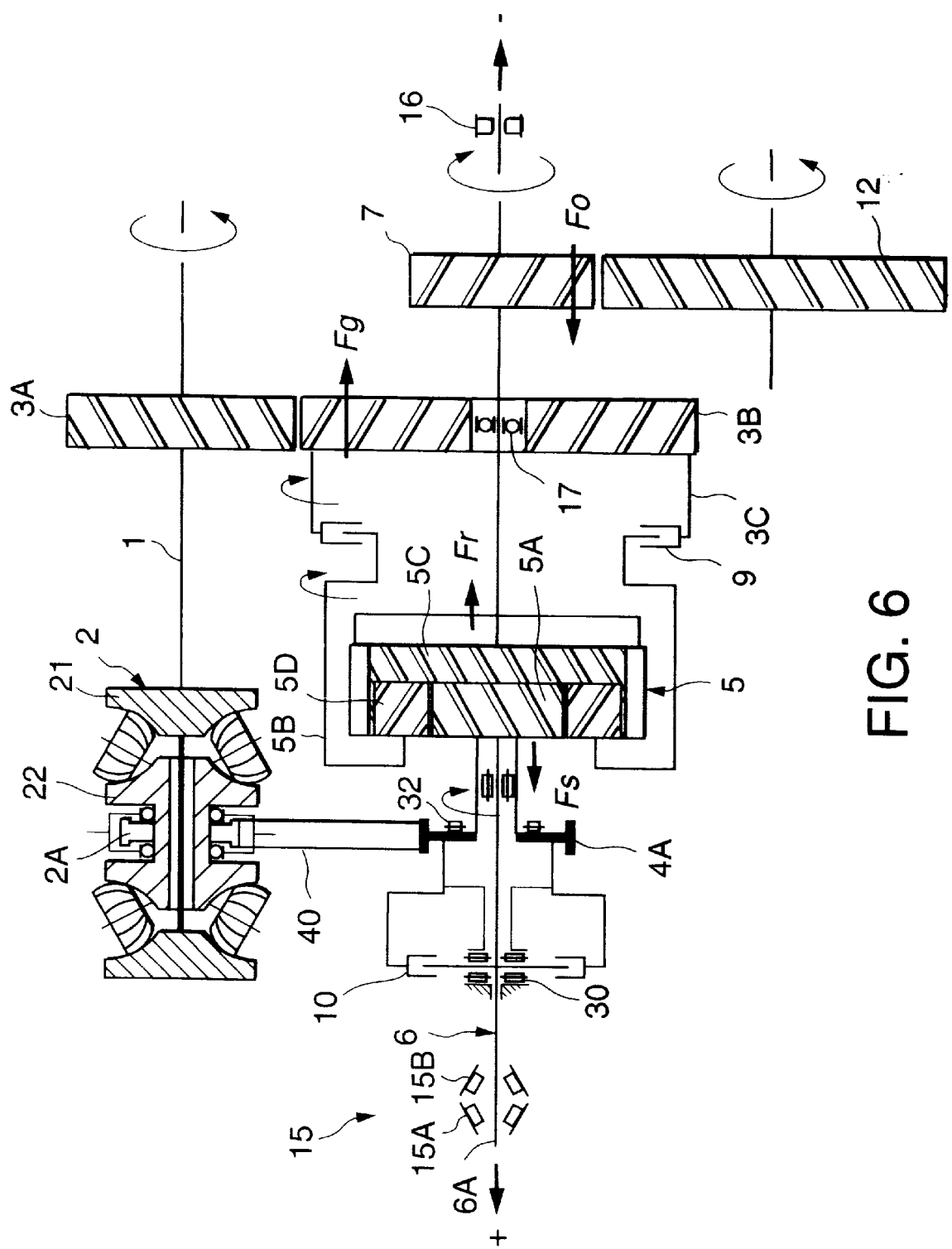
FIG. 6 is similar to FIG. 3, but showing a fourth embodiment of this invention.

Next, a fourth embodiment of this invention will be described referring to FIG. 6.

In this embodiment, the rotation directions of the shafts of the first embodiment is reversed, and the tooth traces of the helical gears are reversed. The remaining features of the construction are the same as those of the first embodiment.

In this embodiment, both the direction of the tooth traces of the gears and their rotation directions are reversed as compared to the first embodiment, so the thrust loads acting on the gears are consequently the same as those of the first embodiment, as shown in the following Table 4.

TABLE 4

|  | Output gear 3B | Sun gear 5A | Ring gear 5C | Device output gear 7 |
|---|---|---|---|---|
| Thrust load | Fg | Fs | Fr | Fo |
| Tooth trace direction | right | left | right | right |
| Thrust load direction | negative | positive | negative | positive |
| Torque transmission | driven | driven | driven | driving |
| Rotation direction | anti-clockwise | anti-clockwise | anti-clockwise | anti-clockwise |

Therefore, also in this embodiment, the sum total of thrust load acting on the final output shaft 6 can be suppressed small as in the first embodiment.

Figure 7:
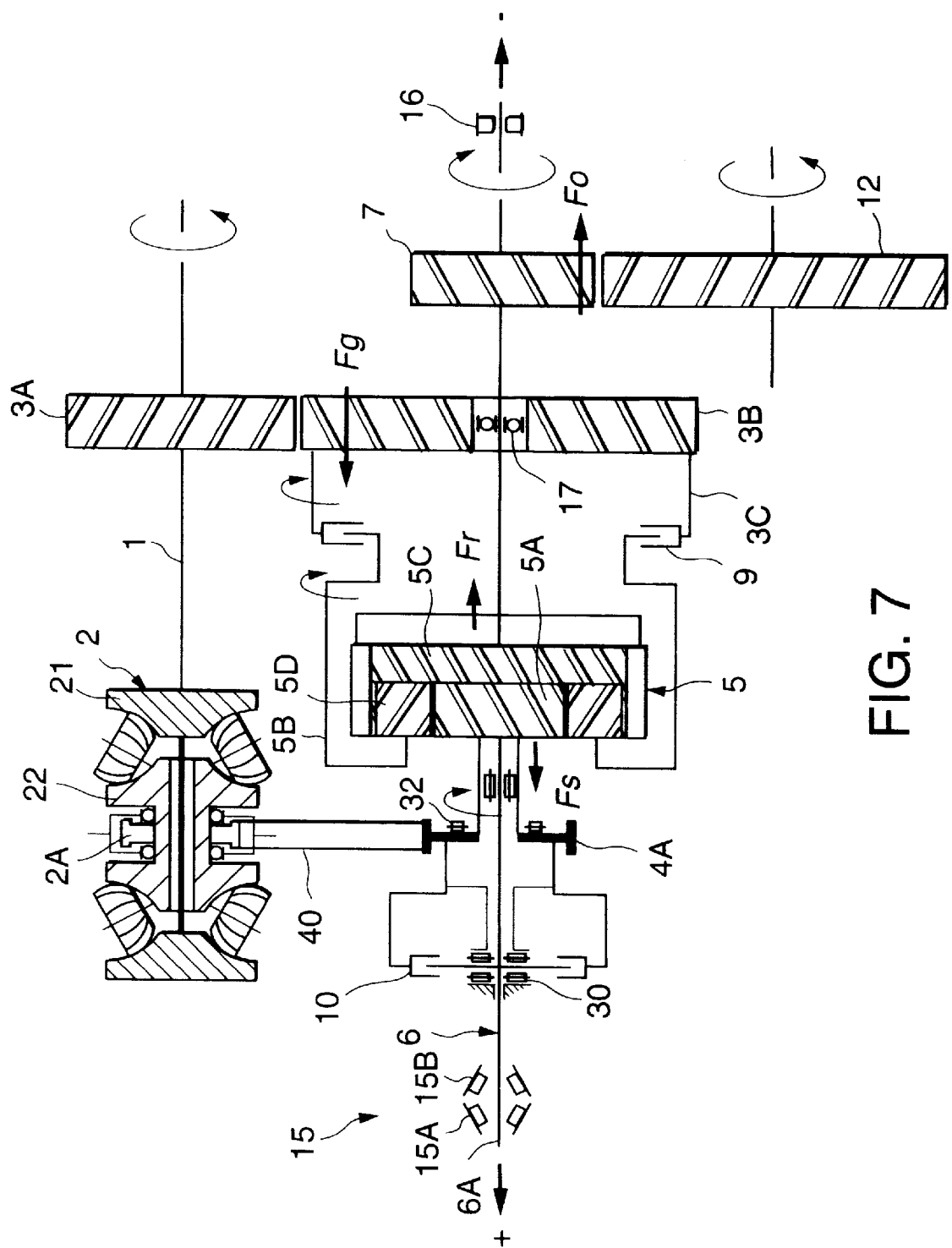
FIG. 7 is similar to FIG. 3, but showing a fifth embodiment of this invention.

Next, a fifth embodiment of this invention will be described referring to FIG. 7.

In this embodiment, the tooth traces of the output gear 3B of the fixed speed ratio transmission 3 of the fourth embodiment and the device output gear 7 are both changed to left-handed. Correspondingly, the tooth traces of the input gear 3A of the fixed speed ratio transmission 3 and final gear 12 are changed to right-handed.

The remaining features of the construction and shaft rotation directions are the same as those of the fourth embodiment.

The thrust loads acting on the gears in this embodiment are shown by the following Table 5.

TABLE 5

|  | Output gear 3B | Sun gear 5A | Ring gear 5C | Device output gear 7 |
|---|---|---|---|---|
| Thrust load | Fg | Fs | Fr | Fo |
| Tooth trace direction | left | left | right | left |
| Thrust load direction | positive | positive | negative | positive |
| Torque transmission | driven | driven | driven | driving |
| Rotation direction | clockwise | clockwise | clockwise | clockwise |

In this embodiment, as in the first embodiment, the positive load of the sun gear 5A is supported by the casing 14, and the thrust loads Fg, Fr, Fo act on the final output shaft 6. As the direction of one load of these three loads differs from the other two loads, the sum total of thrust load acting on the final output shaft 6 can be suppressed small also in this embodiment.

Figure 8:
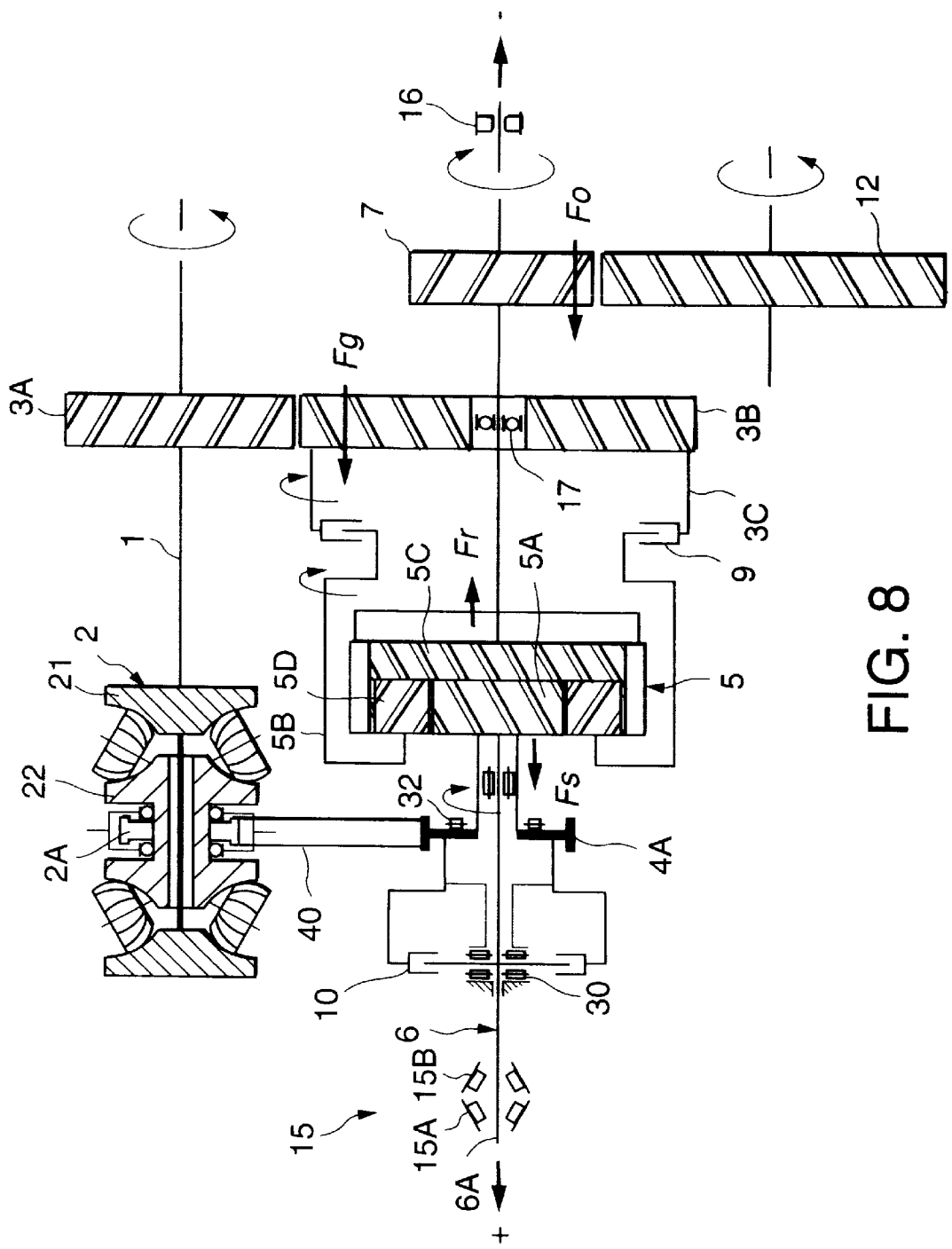
FIG. 8 is similar to FIG. 3, but showing a sixth embodiment of this invention.

Next, a sixth embodiment of this invention will be described referring to FIG. 8.

In this embodiment the tooth trace of the output gear 3B of the fixed speed ratio transmission 3 of the fourth embodiment is changed to left-handed, and correspondingly, the tooth trace of the input gear 3A of the fixed speed ratio transmission 3 is changed to right-handed.

The remaining features of the construction and shaft rotation directions are the same as those of the fourth embodiment. The thrust loads acting on the gears in this embodiment are shown by the following Table 6.

This embodiment is identical to the fourth embodiment except that the thrust load Fg which acts on the output gear 3B is changed to a positive load.

TABLE 6

|  | Output gear 3B | Sun gear 5A | Ring gear 5C | Device output gear 7 |
|---|---|---|---|---|
| Thrust load | Fg | Fs | Fr | Fo |
| Tooth trace direction | left | left | right | right |
| Thrust load direction | positive | positive | negative | positive |
| Torque transmission | driven | driven | driven | driving |
| Rotation direction | clockwise | clockwise | clockwise | clockwise |

Also in this embodiment, as in the first embodiment, the positive load of the sun gear 5A is supported by the casing 14, and the thrust loads Fg, Fr, Fo act on the final output shaft 6. As the direction of one load of these three loads differs from the other two loads, the sum total of thrust load acting on the final output shaft 6 can be suppressed small also in this embodiment.

Figure 9:
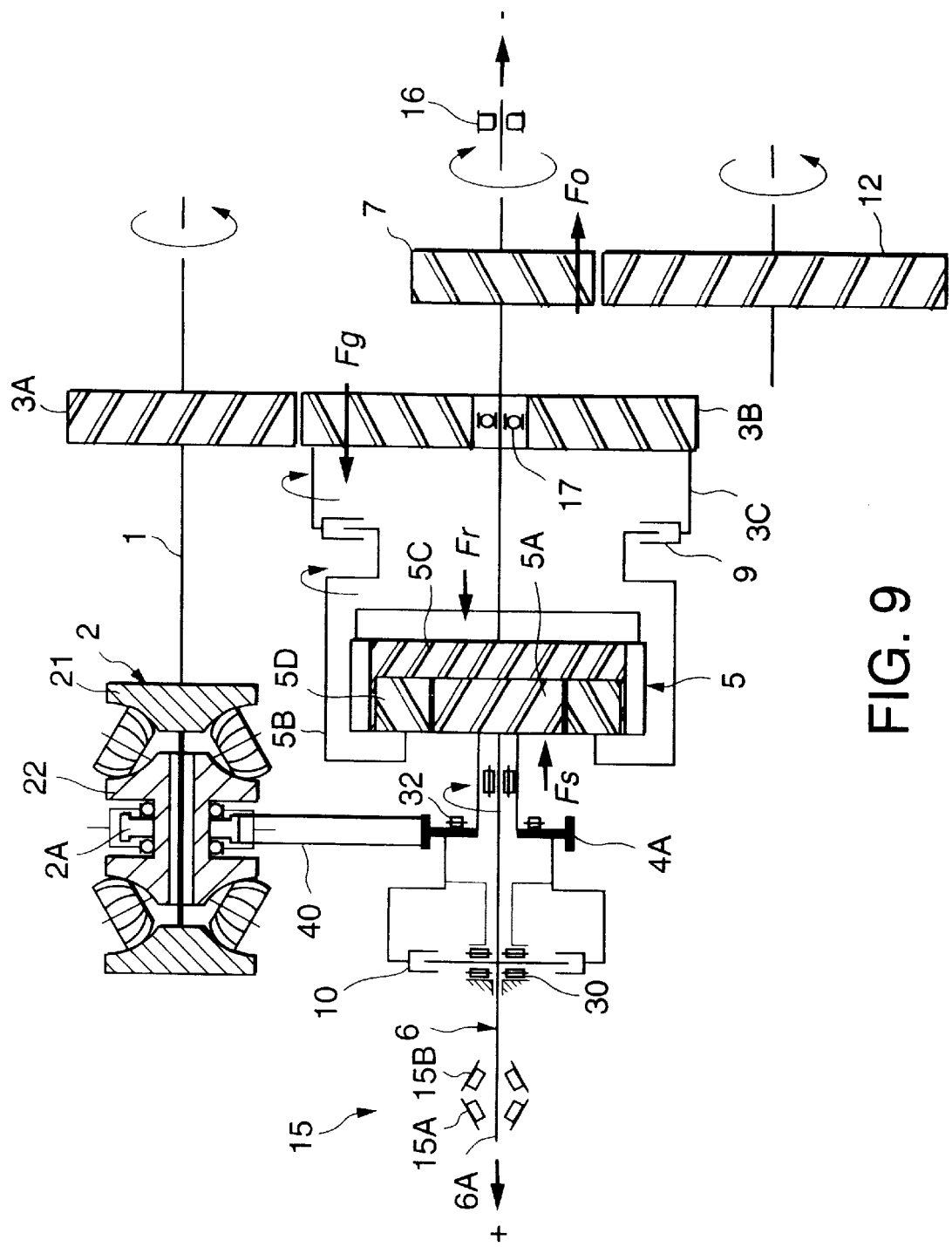
FIG. 9 is similar to FIG. 3, but showing a seventh embodiment of this invention.

Next, a seventh embodiment of this invention will be described referring to FIG. 9.

In this embodiment, the tooth trace of the planetary gear set 5 is set so that the thrust load Fs which acts on the sun gear 5A and the thrust load Fr which acts on the ring gear 5C, cancel each other out, i.e., so that Fs+Fr=0.

The rotation directions of the shaft are set to be the same as those of the fourth embodiment. Therefore, in FIG. 9, the rotation direction of the input shaft 1 when the CVT2 is viewed from side of the output gear 3A of the fixed speed ratio transmission 3, is set anticlockwise, and the rotation direction of the sun gear 5A is set clockwise. When the vehicle moves forward, the final gear 12 rotates anticlockwise and the final output shaft 6 and ring gear 5C rotates clockwise.

The directions of the tooth traces of the fixed speed ratio transmission 3, the planetary gear set 5 and the device output gear 7 are set as follows. The tooth trace of the output gear 3B of the fixed speed ratio transmission 3 is set left-handed, the sun gear is set right-handed, the ring gear 5C is set left-handed, and the device output gear 7 is set left-handed.

Correspondingly, the input gear 3A of the fixed speed ratio transmission 3 and the final gear 12 are set right-handed.

From the directions of the tooth traces and driving/driven relations of these gears, the thrust load acting on the helical gears of the final output shaft 6 are as follows. The thrust load Fg of the output gear 3B is a positive load, the thrust load Fs of the sun gear is a negative load, the thrust load Fr of the ring gear 5C is a positive load, the thrust load Fo of the device output gear 7 is a negative load, and |Fs|=|Fr|.

TABLE 7

|  | Output gear 3B | Sun gear 5A | Ring gear 5C | Device output gear 7 |
|---|---|---|---|---|
| Thrust load | Fg | Fs | Fr | Fo |
| Tooth trace direction | left | right | left | left |
| Thrust load direction | positive | negative | positive | negative |
| Torque transmission | driven | driven | driven | driving |

TABLE 7-continued

| | Output gear 3B | Sun gear 5A | Ring gear 5C | Device output gear 7 |
|---|---|---|---|---|
| Rotation direction | clockwise | clockwise | clockwise | clockwise |

As shown in FIG. 2, the negative thrust load Fs which acts on the sun gear 5A is transmitted to the planet carrier 5B via the needle bearing 32. On the other hand, the positive thrust load Fr acting on the gear 5C is transmitted to the planet carrier 5B via the needle bearing 33.

These loads therefore cancel each other out in the planet carrier 5B, and are not transmitted to the final output shaft 6. Therefore, the total thrust load which acts on the final output shaft 6 is (Fg+Fo).

Here, the thrust load Fg which acts on the output gear 3B of the fixed speed ratio transmission 3 is a positive load, and the thrust load Fo which acts on the transmission output gear 7 is a negative load. Therefore, the total arm thrust load (Fg+Fo) produced in the final output shaft 6 is suppressed small.

Figure 10:
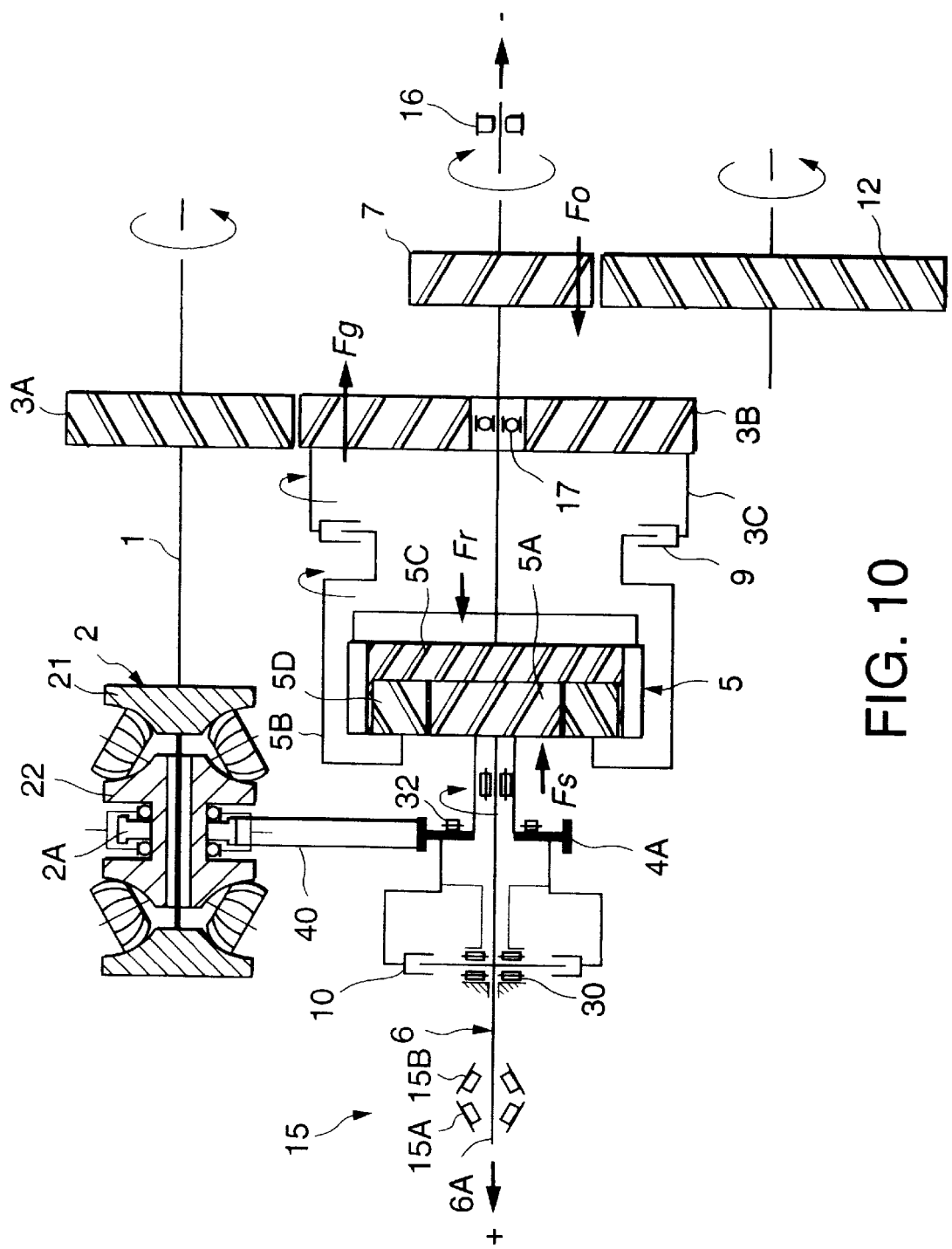
FIG. 10 is similar to FIG. 3, but showing an eighth embodiment of this invention.
Figure 11:
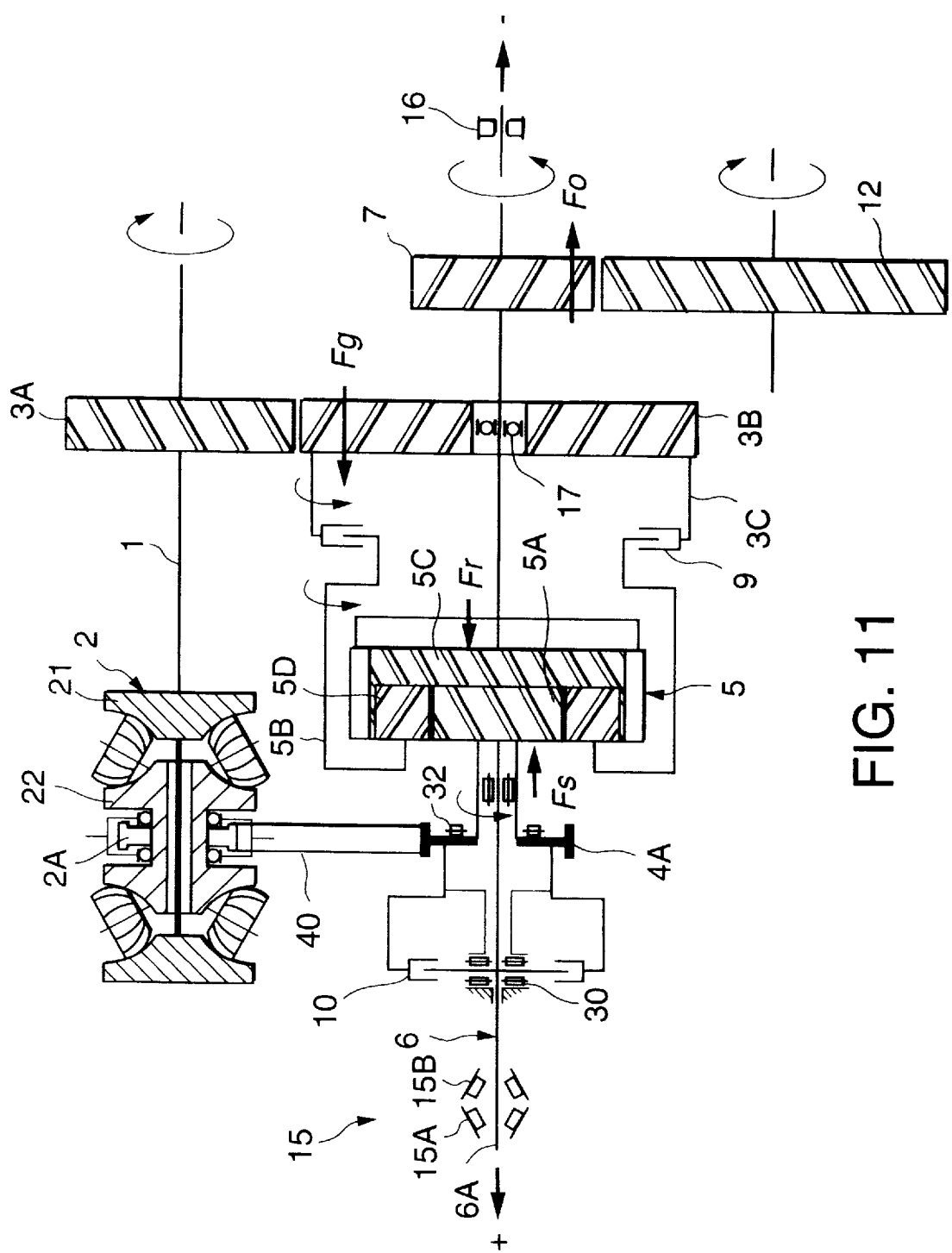
FIG. 11 is similar to FIG. 3, but showing a ninth embodiment of this invention.

Next, an eighth embodiment of this invention will be described referring to FIG. 10.

In this embodiment, the tooth traces of the output gear 3B of the fixed speed ratio transmission 3 and the device output gear 7 of the seventh embodiment are changed to be both right-handed, and the tooth traces of the input gear 3A of the fixed speed ratio transmission 3 and final gear 12 are both changed to be left-handed.

The remaining features of the construction and shaft rotation directions are the same as those of the seventh embodiment. The thrust loads acting on the gears in this embodiment are shown by the following Table 8.

TABLE 8

| | Output gear 3B | Sun gear 5A | Ring gear 5C | Device output gear 7 |
|---|---|---|---|---|
| Thrust load | Fg | Fs | Fr | Fo |
| Tooth trace direction | right | right | left | right |
| Thrust load direction | negative | negative | positive | positive |
| Torque transmission | driven | driven | driven | driving |
| Rotation direction | clockwise | clockwise | clockwise | clockwise |

Also in this embodiment, the thrust load Fs which acts on the sun gear 5A, and the thrust load Fr which acts on the ring gear 5C, cancel each other out.

Therefore, the thrust loads which act on the final output shaft are only the thrust load Fg of the output gear 3B of the fixed speed ratio transmission 3, and the thrust load Fo of the transmission output gear 7. These loads act in different directions, so the thrust load (Fs+Fo) produced in the final output shaft 6 is suppressed small.

Next, a ninth embodiment of this invention will be described referring to FIG. 1.

In this embodiment, the rotation directions of the shafts of the seventh embodiment are reversed, and the tooth traces of the planetary gear set 5 are set so that the thrust load Fs acting on the sun gear 5A and the thrust load Fr acting on the ring gear 5C cancel each other out. The rotation directions of the shafts are identical to those of the first embodiment.

The direction of the tooth traces of the helical gears are as follows. The output gear 3B of the fixed speed ratio transmission 3 is set right-handed, the sun gear 5A is set left-handed, the ring gear 5C is set right-handed, and the device output gear 7 is set right-handed.

Correspondingly, the input gear 3A of the fixed speed ratio transmission 3 is set left-handed, and the final gear 12 is set left-handed.

The directions in which the thrust loads act according to this embodiment are shown in Table 9.

TABLE 9

| | Output gear 3B | Sun gear 5A | Ring gear 5C | Device output gear 7 |
|---|---|---|---|---|
| Thrust load | Fg | Fs | Fr | Fo |
| Tooth trace direction | right | left | right | right |
| Thrust load direction | positive | negative | positive | negative |
| Torque transmission | driven | driven | driven | driving |
| Rotation direction | clockwise | clockwise | clockwise | clockwise |

Also in this embodiment, as the thrust load Fs of the sun gear 5A and the thrust load Fr of the ring gear 5C cancel each other out, the total thrust load which acts on the final output shaft 6 is (Fg+Fo).

Herein, the thrust load Fg which acts on the output gear 3B of the fixed speed ratio transmission 3 is a positive load, and the thrust load Fo which acts on the device output gear 7 is a negative load. Therefore, the total thrust load (Fg+Fo) produced in the final output shaft 6 is suppressed small.

Figure 12:
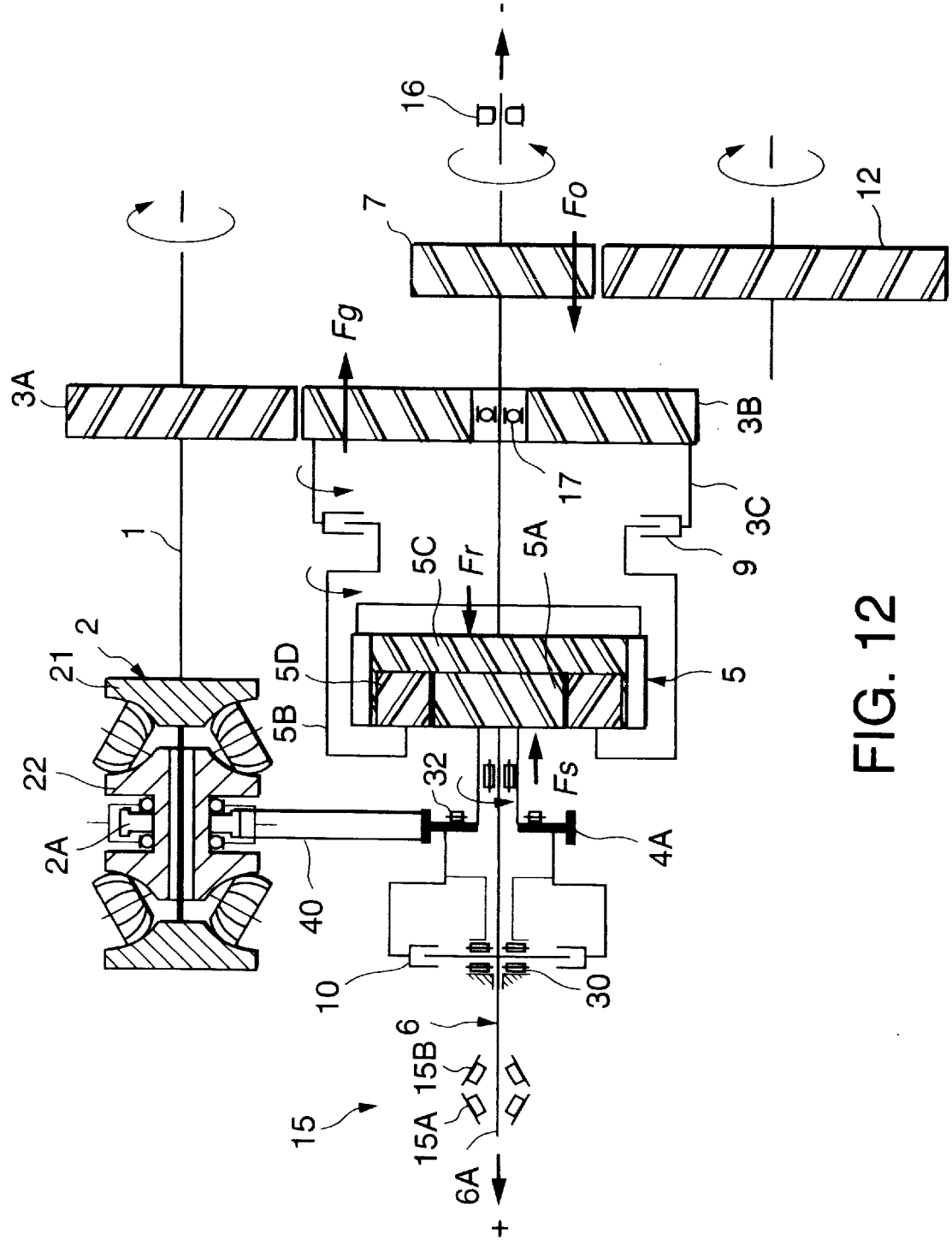
FIG. 12 is similar to FIG. 3, but showing a tenth embodiment of this invention.

Next, a tenth embodiment of this invention will be described referring to FIG. 12.

In this embodiment, the directions of the tooth traces of the output gear 3B of the fixed speed ratio transmission 3 and the device output gear 7 of the ninth embodiment are changed to left-handed, and correspondingly, the tooth traces of the input gear 3A of the fixed speed ratio transmission 3 and final gear 12 are changed to right-handed.

The remaining features of the construction and shaft rotation directions are the same as those of the ninth embodiment. The thrust loads acting on the gears in this embodiment are shown by Table 10.

TABLE 10

| | Output gear 3B | Sun gear 5A | Ring gear 5C | Device output gear 7 |
|---|---|---|---|---|
| Thrust load | Fg | Fs | Fr | Fo |
| Tooth trace direction | left | left | right | left |
| Thrust load direction | negative | negative | positive | positive |
| Torque transmission | driven | driven | driven | driving |
| Rotation direction | anti-clockwise | anti-clockwise | anti-clockwise | anti-clockwise |

In this embodiment, as the thrust load Fs of the sun gear 5A and the thrust load Fr of the ring gear 5C cancel each other out, the total thrust load which acts on the final output shaft 6 is (Fg+Fo).

Here, the thrust load Fg which acts on the output gear of the fixed speed ratio transmission 3 is a negative load, and the thrust load Fo which acts on the speed output gear 7 is a positive load. Therefore, the total thrust load (Fg+Fo ) produced in the final output shaft 6 is suppressed small.

The contents of Tokugan Hei 11-18260, with a filing date of Jan. 27, 1999 in Japan and Tokugan Hei 11-73426, with a filing date of Mar. 18, 1999 in Japan, are hereby incorporated by reference.

Although the invention has been described above by reference to certain embodiments of the invention, the invention is not limited to the embodiments described above. Modifications and variations of the embodiments described above will occur to those skilled in the art, in light of the above teachings.

Figure 13:
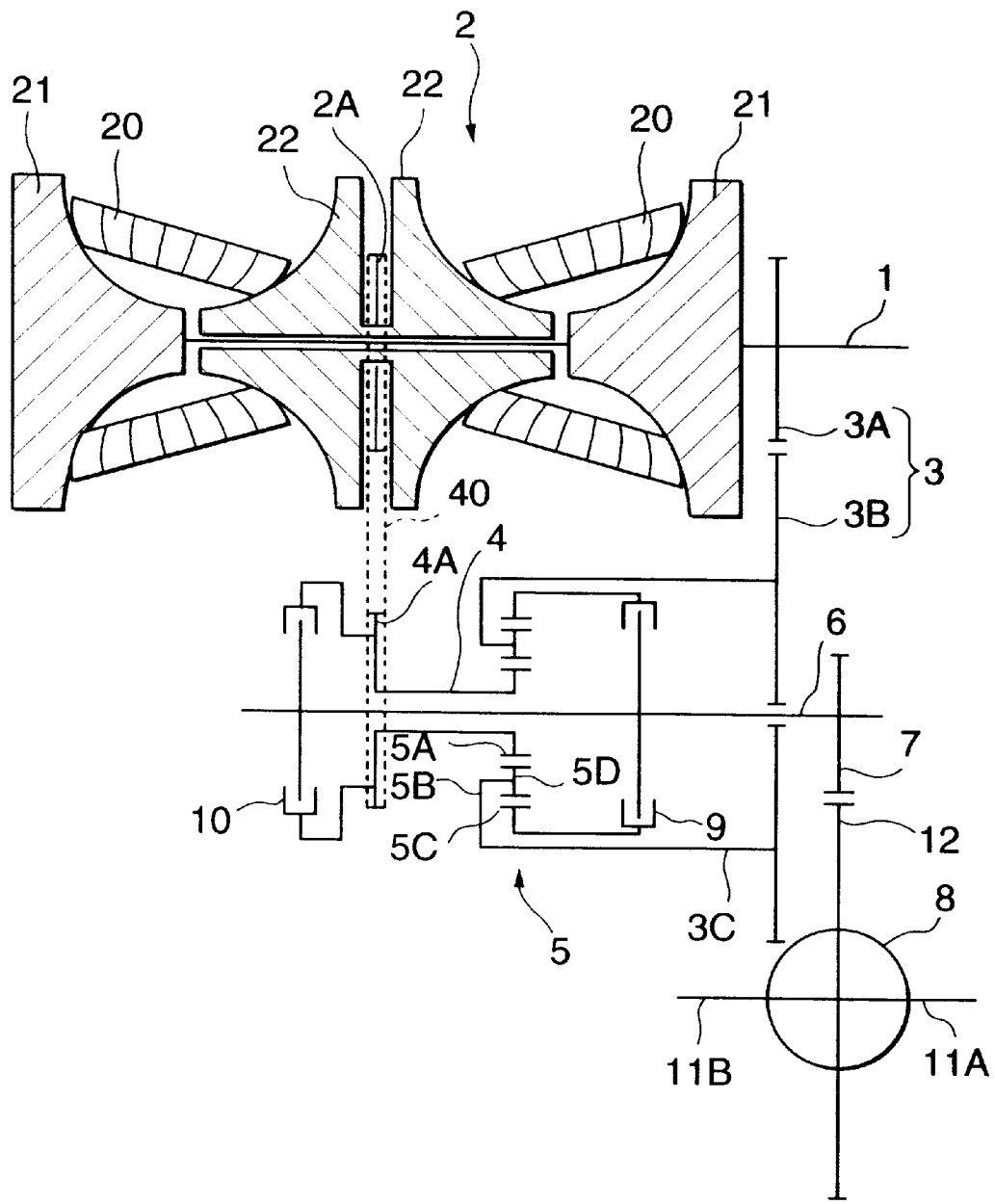
FIG. 13 is similar to FIG. 1, but showing a possible variation regarding the disposition of a power circulation clutch.

For example, in all the above embodiments, the power circulation mode clutch 9 is disposed between the output gear 3B of the fixed speed ratio transmission 3 and the planet carrier 5B. However, the power circulation mode clutch 9 can be arranged in any position between the input shaft 1 and the device output gear 7. For example, as shown in FIG. 13, the power circulation mode clutch 9 may be disposed between the ring gear 5C and the final output shaft 6.

Figure 14:
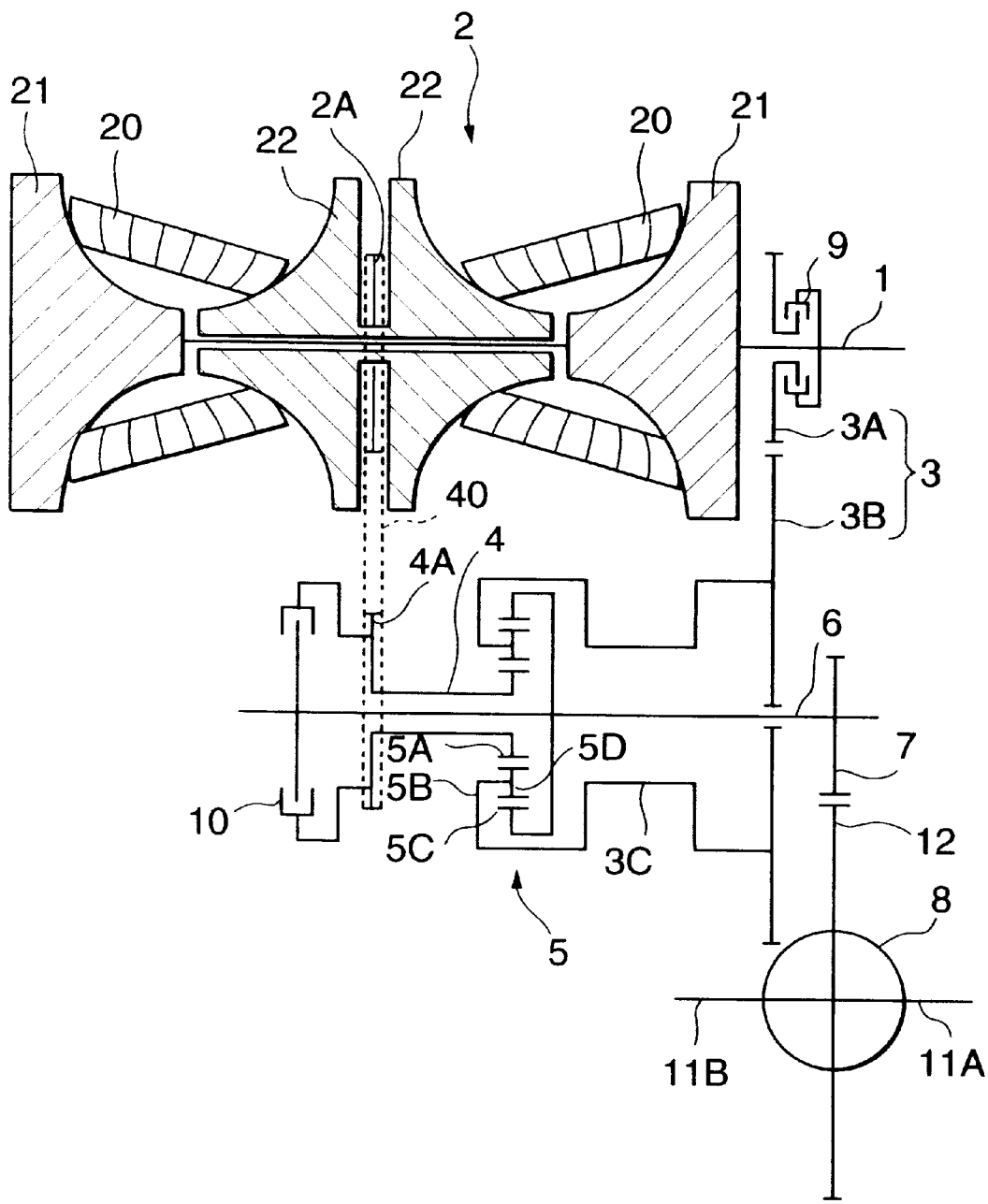
FIG. 14 is similar to FIG. 1, but showing another possible variation regarding the disposition of the power circulation clutch.
Figure 15:
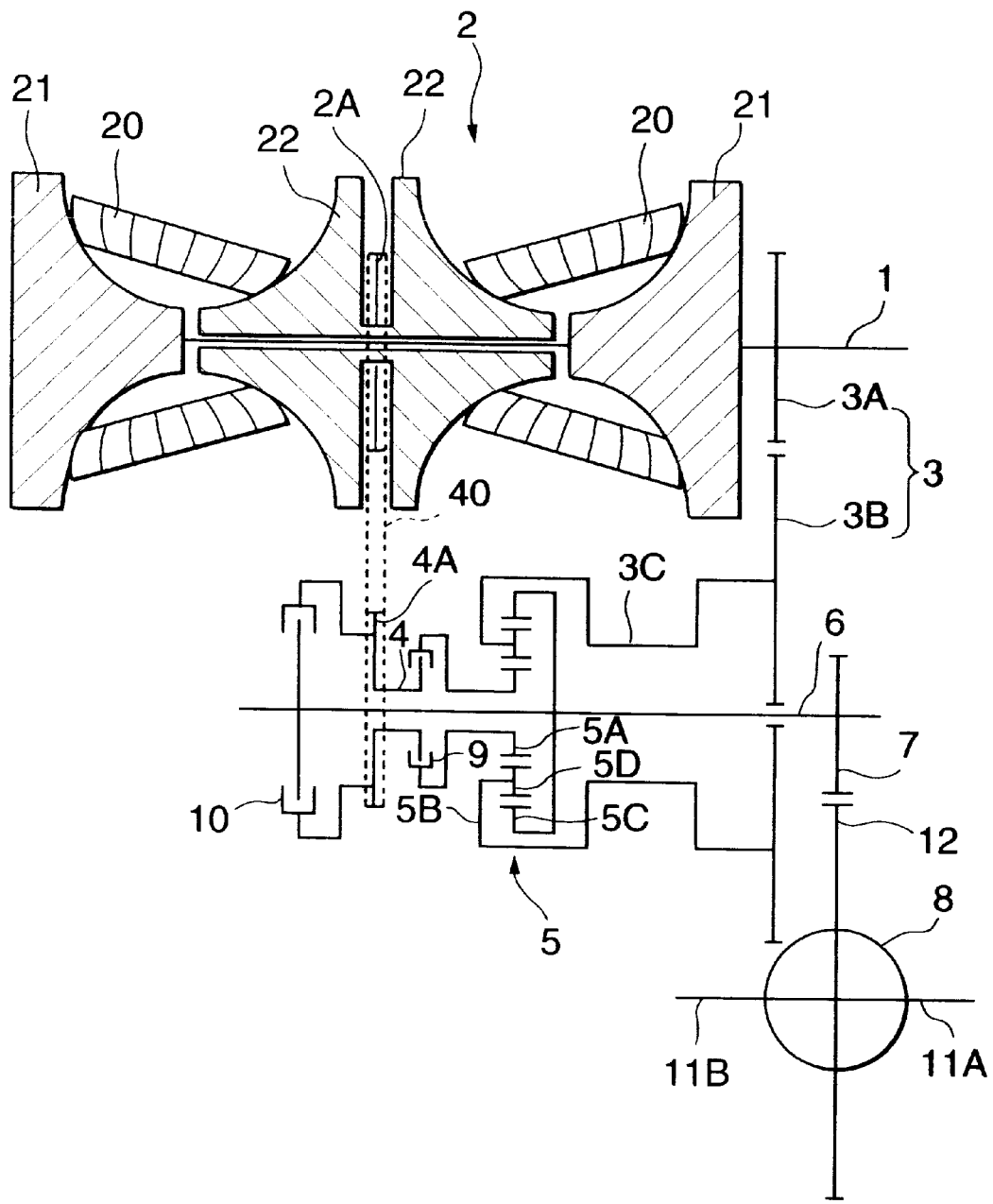
FIG. 15 is similar to FIG. 1, but showing still another possible variation regarding the disposition of the power circulation clutch.

Moreover, as shown in FIG. 14, the power circulation mode clutch 9 m ay be disposed between the input shaft 1 and the input gear 3A of the fixed speed ratio transmission 3. The power circulation mode clutch 9 may also be provided midway in the CVT output shaft 4, as shown in FIG. 15. The aforesaid first-tenth embodiments may be applied to an infinite speed ratio device having the power circulation mode clutch 9 disposed in any of the aforesaid positions.

The embodiments of this invention in which an exclusive property or privilege is claimed are defined as follows:

1. An infinite speed ratio transmission device for a vehicle comprising:

an input shaft;

a final output shaft;

a planetary gear set comprising a planet gear, a planet carrier supporting the planet gear, a sun gear externally connected to the planet gear, and a ring gear internally connected to the planet gear, the ring gear being joined to the final output shaft;

a continuously variable transmission for transmitting a rotation of the input shaft to the sun gear at an arbitrary speed ratio;

a fixed speed ratio transmission comprising an input gear fixed to the input shaft, and an output gear which is engaged with the input gear, fixed to the planet carrier and rotating around the final output shaft;

a device output gear fixed to the final output shaft; and a final gear engaging with the device output gear;

wherein, the input gear, the output gear, the device output gear, the final gear, the sun gear, the planet gear and the ring gear comprise helical gears having oblique tooth traces;

the directions of the tooth traces of the sun gear, planet gear and ring gear are set so that a thrust load exerted by the planet carrier, which rotates faster than the sun gear, on the sun gear via the planet gear, and a thrust load exerted by the planet carrier, which rotates faster than the sun gear, on the ring gear via the planet gear, do not cancel each other out;

a member is provided which supports a load acting on the sun gear along the final output shaft; and the directions of the tooth traces of the output gear, the input gear, the device output gear, and the final gear are set so that either of the thrust load acting on the device output gear and the thrust load acting on the output gear is opposite to the thrust load acting on the ring gear, wherein the output gear is disposed between the planetary gear set and the device output gear, and a rotation direction of the final output shaft corresponding to forward motion of the vehicle is anticlockwise when the planetary gear set is viewed from the device output gear, the tooth trace of the sun gear is right-handed, the tooth trace of the planet gear is left-handed and the tooth trace of the ring gear is left-handed.

2. An infinite speed ratio transmission device as defined in claim 1, wherein the tooth trace of the output gear is left-handed and the tooth trace of the device output gear is left-handed.

3. An infinite speed ratio transmission device as defined in claim 1, wherein the tooth trace of the output gear is right-handed and the tooth trace of the device output gear is right-handed.

4. An infinite speed ratio transmission device as defined in claim 1, wherein the tooth trace of the output gear is right-handed and the tooth trace of the device output gear is left-handed.

5. An infinite speed ratio transmission device for a vehicle comprising:

an input shaft;

a final output shaft;

a planetary gear set comprising a planet gear, a planet carrier supporting the planet gear, a sun gear externally connected to the planet gear, and a ring gear internally connected to the planet gear, the ring gear being joined to the final output shaft;

a continuously variable transmission for transmitting a rotation of the input shaft to the sun gear at an arbitrary speed ratio;

a fixed speed ratio transmission comprising an input gear fixed to the input shaft, and an output gear which is engaged with the input gear, fixed to the planet carrier and rotating around the final output shaft;

a device output gear fixed to the final output shaft; and a final gear engaging with the device output gear;

wherein, the input gear, the output gear, the device output gear, the final gear, the sun gear, the planet gear and the ring gear comprise helical gears having oblique tooth traces;

the directions of the tooth traces of the sun gear, planet gear and ring gear are set so that a thrust load exerted by the planet carrier, which rotates faster than the sun gear, on the sun gear via the planet gear, and a thrust load exerted by the planet carrier, which rotates faster than the sun gear, on the ring gear via the planet gear, do not cancel each other out;

a member is provided which supports a load acting on the sun gear along the final output shaft; and the directions of the tooth traces of the output gear, the input gear, the device output gear, and the final gear are set so that either of the thrust load acting on the device output gear and the thrust load acting on the output gear is opposite to the thrust load acting on the ring gear, wherein the output gear is disposed between the planetary gear set and the device output gear, and a rotation direction of the final output shaft corresponding to forward motion of the vehicle is clockwise when the planetary gear set is viewed from the device output gear, the tooth trace of the sun gear is left-handed, the tooth trace of the planet gear is right-handed and the tooth trace of the ring gear is right-handed.

6. An infinite speed ratio transmission device as defined in claim 5, wherein the tooth trace of the output gear is right-handed and the tooth trace of the device output gear is right-handed.

7. An infinite speed ratio transmission device as defined in claim 5, wherein the tooth trace of the output gear is left-handed and the tooth trace of the device output gear is left-handed.

8. An infinite speed ratio transmission device as defined in claim 5, wherein the tooth trace of the output gear is left-handed and the tooth trace of the device output gear is right-handed.

9. An infinite speed ratio transmission device for a vehicle comprising:
an input shaft;
a final output shaft;
a planetary gear set comprising a planet gear, a planet carrier supporting the planet gear, a sun gear externally connected to the planet gear, and a ring gear internally connected to the planet gear, the ring gear being joined to the final output shaft;
a continuously variable transmission for transmitting a rotation of the input shaft to the sun gear at an arbitrary speed ratio;
a fixed speed ratio transmission comprising an input gear fixed to the input shaft, and an output gear which is engaged with the input gear, fixed to the planet carrier and rotating around the final output shaft;
a device output gear fixed to the final output shaft; and
a final gear engaging with the device output gear;
wherein, the input gear, the output gear, the device output gear, the final gear, the sun gear, the planet gear and the ring gear comprise helical gears having oblique tooth traces;
the directions of the tooth traces of the sun gear, planet gear and ring gear are set so that a thrust load exerted by the planet carrier, which rotates faster than the sun gear, on the sun gear via the planet gear, and a thrust load exerted by the planet carrier, which rotates faster than the sun gear, on the ring gear via the planet gear, do not cancel each other out;
a member is provided which supports a load acting on the sun gear along the final output shaft; and
the directions of the tooth traces of the output gear, the input gear, the device output gear, and the final gear are set so that either of the thrust load acting on the device output gear and the thrust load acting on the output gear is opposite to the thrust load acting on the ring gear,
wherein a helix angle of the output gear is defined by the following equation:

$$\frac{\tan\beta o}{(1+\alpha)\cdot Ro} = \frac{\tan\beta g}{Rg} + \frac{\tan\beta r}{(1+\alpha)\cdot Rr}$$

where, βg=helix angle of fixed speed ratio output gear,
Rg=radius of pitch circle of fixed speed ratio output gear,
βO=helix angle of transmission device output gear,
Ro=radius of pitch circle of transmission output gear,
βr=helix angle of ring gear,
Rr=radius of pitch circle of ring gear, and
α=number of teeth of sun gear/number of teeth of ring gear.

10. An infinite speed ratio transmission device for a vehicle, comprising:
an input shaft;
a final output shaft;
a planetary gear set comprising a planet gear, a planet carrier supporting the planet gear, a sun gear externally connected to the planet gear, and a ring gear internally connected to the planet gear, the ring gear being joined to the final output shaft;
a continuously variable transmission for transmitting a rotation of the input shaft to the sun gear at an arbitrary speed ratio;
a fixed speed ratio transmission comprising an input gear fixed to the input shaft, and an output gear which is engaged with the input gear, fixed to the planet carrier and rotating around the final output shaft;
a device output gear fixed to the final output shaft; and
a final gear engaging with the device output gear;
wherein, the input gear, the output gear, the device output gear, the final gear, the sun gear, the planet gear and the ring gear comprise helical gears having oblique tooth traces;
the directions of the tooth traces of the sun gear, planet gear and ring gear are set so that a thrust load exerted by the planet carrier, which rotates faster than the sun gear, on the sun gear via the planet gear, and a thrust load exerted by the planet carrier, which rotates faster than the sun gear, on the ring gear via the planet gear, cancel each other out; and
the directions of the tooth traces of the fixed output gear, the fixed input gear, the device output gear, and the final gear are set so that the thrust load acting on the device output gear and the thrust load acting on the output gear act on the final output shaft in opposite directions,
wherein the output gear is disposed between the planetary gear set and the device output gear, and a rotation direction of the final output shaft corresponding to forward motion of the vehicle is clockwise when the planetary gear set is viewed from the device output gear, the tooth trace of the sun gear is right-handed, the tooth trace of the planet gear is left-handed and the tooth trace of the ring gear is left-handed.

11. An infinite speed ratio transmission device as defined in claim 10, wherein the tooth trace of the output gear is left-handed and the tooth trace of the device output gear is left-handed.

12. An infinite speed ratio transmission device as defined in claim 10, wherein the tooth trace of the output gear is right-handed and the tooth trace of the device output gear is right-handed.

13. An infinite speed ratio transmission device for a vehicle, comprising:
an input shaft;
a final output shaft;
a planetary gear set comprising a planet gear, a planet carrier supporting the planet gear, a sun gear externally connected to the planet gear, and a ring gear internally connected to the planet gear, the ring gear being joined to the final output shaft;
a continuously variable transmission for transmitting a rotation of the input shaft to the sun gear at an arbitrary speed ratio;

a fixed speed ratio transmission comprising an input gear fixed to the input shaft, and an output gear which is engaged with the input gear, fixed to the planet carrier and rotating around the final output shaft;

a device output gear fixed to the final output shaft; and a final gear engaging with the device output gear;

wherein, the input gear, the output gear, the device output gear, the final gear, the sun gear, the planet gear and the ring gear comprise helical gears having oblique tooth traces;

the directions of the tooth traces of the sun gear, planet gear and ring gear are set so that a thrust load exerted by the planet carrier, which rotates faster than the sun gear, on the sun gear via the planet gear, and a thrust load exerted by the planet carrier, which rotates faster than the sun gear, on the ring gear via the planet gear, cancel each other out; and the directions of the tooth traces of the fixed output gear, the fixed input gear, the device output gear, and the final gear are set so that the thrust load acting on the device output gear and the thrust load acting on the output gear act on the final output shaft in opposite directions, wherein, the output gear is disposed between the planetary gear set and the device output gear, and a rotation direction of the final output shaft corresponding to forward motion of the vehicle is anti-clockwise when the planetary gear set is viewed from the device output gear, the tooth trace of the sun gear is left-handed, the tooth trace of the planet gear is right-handed and the tooth trace of the ring gear is right-handed.

14. An infinite speed ratio transmission device as defined in claim 13, wherein the tooth trace of the output gear is right-handed and the tooth trace of the device output gear is right-handed.

15. An infinite speed ratio transmission device as defined in claim 13, wherein the tooth trace of the output gear is right-handed and the tooth trace of the device output gear is right-handed.

* * * * *